US009369344B2

(12) United States Patent
Datla et al.

(10) Patent No.: US 9,369,344 B2
(45) Date of Patent: Jun. 14, 2016

(54) AUTOMATED TECHNIQUES TO DEPLOY A CONVERGED INFRASTRUCTURE HAVING UNKNOWN INITIAL COMPONENT CONFIGURATIONS

(71) Applicant: Cisco Technology, Inc., San Jose, CA (US)

(72) Inventors: Raju Datla, Pleasanton, CA (US); Parthasarathy Venkatavaradhan, Sunnyvale, CA (US); Ravikumar Pisupati, San Jose, CA (US); Srinivas Velpuri, Dublin, CA (US); Rama Kanchana, Dublin, CA (US)

(73) Assignee: Cisco Technology, Inc., San Jose, CA (US)

( * ) Notice: Subject to any disclaimer, the term of this patent is extended or adjusted under 35 U.S.C. 154(b) by 365 days.

(21) Appl. No.: 14/022,435

(22) Filed: Sep. 10, 2013

(65) Prior Publication Data

US 2014/0109094 A1    Apr. 17, 2014

Related U.S. Application Data

(60) Provisional application No. 61/712,551, filed on Oct. 11, 2012.

(51) Int. Cl.
*H04L 12/24* (2006.01)
*G06F 9/46* (2006.01)

(52) U.S. Cl.
CPC .............. *H04L 41/0883* (2013.01); *G06F 9/46* (2013.01); *H04L 41/0806* (2013.01)

(58) Field of Classification Search
None
See application file for complete search history.

(56) References Cited

U.S. PATENT DOCUMENTS

| | | |
|---|---|---|
| 2003/0177412 A1 | 9/2003 | Todd |
| 2006/0064619 A1 | 3/2006 | Wen et al. |
| 2007/0168493 A1 | 7/2007 | Sarwono et al. |
| 2012/0151036 A1 | 6/2012 | Detro et al. |
| 2013/0036214 A1 | 2/2013 | Carmel et al. |

FOREIGN PATENT DOCUMENTS

WO        2014/022341 A1    2/2014

OTHER PUBLICATIONS

Scaramella, "HP Blade System Matrix: Delivering the Converged Infrastructure," IDC, White Paper, Jun. 2010, 11 pages.
UBM TechWeb, "Five Reasons to Make the Move to a Converged Infrastructure," A UBM TechWeb White Paper, Sep. 2012, 5 pages.

*Primary Examiner* — Qing Wu
(74) *Attorney, Agent, or Firm* — Edell, Shapiro & Finnan, LLC

(57) ABSTRACT

A technique to adaptively configure components of a converged infrastructure (CI). Component configuration information is collected from and representative of operating storage, compute, and network components of the CI. A pod descriptor is constructed from the collected information. The pod descriptor includes operating storage, compute, and network component configuration definitions for the CI based on the collected component configuration information. A package specification unit is generated based on the component configuration definitions of the pod descriptor. The package specification unit includes tasks that, when executed, automatically inventory, assess, and configure targeted ones of the CI components. The technique executes the tasks in the package specification unit to perform corresponding operations on targeted ones of the CI components.

21 Claims, 14 Drawing Sheets

CONFIGURATION TASK DEFINITION  700

LABEL 704: `<config-task-def id="netapp-disk-assign" category="Storage" label="Disk">`

ARGUMENTS 702:
`<arg name="disk" type="string" mandatory="true" label="Disk"/>`
`<arg name="owner" type="string" mandatory="true" label="Owner"/>`

`<config>`

CONFIGURATION SNIPPET 706:
```
<![CDATA[
    <disk-sanown-assign>
        <disk>$disk</disk>
        <owner>$owner</owner>
    <disk-sanown-assign>
]]>
```

`<config>`

`</config-task-def>`

FIG.7

INVENTORY TASK DEFINITION 800

─802

<task id="n5k-B-system-info" ref="query-network-device" label="System Info" >

804 {
   <task-arg name="variable" value="DeviceInfo,NX-OS" />
   <task-arg name="parentElem" value="DeviceInfo" />
   <task-arg name="attrLst"

805 {
value="Hostname,Model, Version,SerialNumber" />
<returns name="Hostname,Model,Version,SerialNumber" type="table" />

</task>
─806

FIG.8A

INVENTORY TASK DEFINITION 810

─812

<task ref="query-netapp" id="fcp-adapter-list-info" />

814 {
   <task-arg value="fcp-adapter-list-info" name="varList" />
   <task-arg value="fcp-config-adapter-info" name="parentElem" />
   <task-arg value="adapter,port-name" name="attrList" />

816 ── <returns type="table" name="adapter,port-name" />

</task>
─818

FIG.8B

INVENTORY TASK DEFINITION 820

─832

<task ref="query-netapp" id="emc-get-disk-info" >

834 {
   <task-arg value="fcp-adapter-list-info" name="varList" />
   <task-arg value="fcp-config-adapter-info" name="parentElem" />
   <task-arg value="adapter,port-name" name="attrList" />

836 ── <returns type="table" name="adapter,port-name" />

</task>
─838

FIG.8C

ASSESSMENT TASK DEFINITION 900

```
                                            902
<task id="n5k-B-model" ref="query-network-device" label="Device Model"
                         expected-value="Nexus5XXX"  906
         ┌ failure-impact="FlexPod provisioning may fail"
    902 ┤  failure-remedy="Replace this device with Nexus 5XXX model"
         └ failure-status:"critical" summary-report="true">
         ┌ <task-arg name="variable" value="DeviceInfo,NX-OS" />
    904 ┤  <task-arg name="parentElem" value="DeviceInfo" />
         └ <task-arg name="attrlist" value="Model" />
                                              910
         ┌ <returns name="Model" type="table" />
    908 ┤
         └ <validation name="nexusMode" param"Model" type="regexp"
         value="Nexus5[O-9]*" summary-report="true"/>
    </task>
```

FIG.9

CONFIGURATION TASK DEFINITION 1000

```
                         1002
<task id="n5k-configure-interface-2" ref="n5k-configure-interface" label=Configure
Description Eth1/2" />
         ┌ <task-arg name="name" value="Eth1/2" />
    1004 ┤
         └ <task-arg name="description" value="${var_ntap_B_hostname}:e2a" />
</task>
```

FIG.10

TASK SEQUENCE    1100

1102
<task id="create-volume-1"
— ref="netapp-create-volume"

label="Create volume for Infrastructure vFiler">

</task>

1104 {
<task-arg name="name" value="${volume_name}" />
<task-arg name="aggr" value="${aggregate_name}" />
<task-arg name="size" value="${volume_size_in_mb}m" />
}

</task>

1106
<task id="create-volume-2" ref="netapp-create-volume" label="Create volume for NFS Datastore">

1108 {
<task-arg name="name" value="${volume_ds_name}" />
<task-arg name="aggr" value="${aggregate_name}" />
<task-arg name="size" value="${ds_volume_size_in_mb}m" />
}

</task>

1120
<task id="enable-sis-l" ref="netapp-enable-sis" label="Enable sis" >

1122 —— <task-arg name="path" value="${path_name}" />

</task>

FIG.11

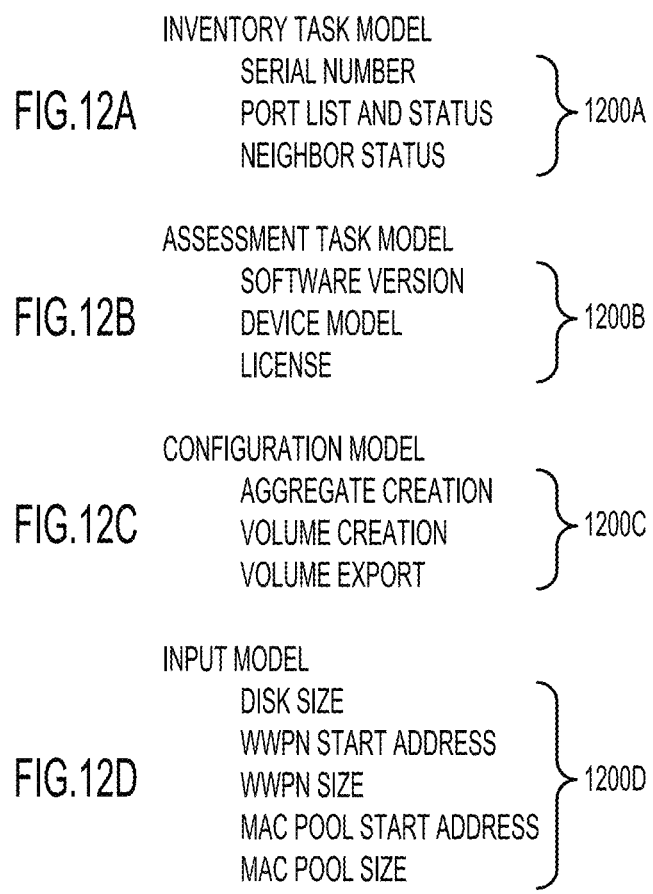

1500

FlexPod for VMware Deployment Model
FlexPod for VMware Overview
FlexPod for VMware Architecture
FlexPod for VMware Configuration Deployment
    Cabling Information
1510 —— NetApp FAS3210A Deployment Procedure--Part I
1512 —— Cisco Nexus 5548 Deployment Procedure--Part I
    Cisco Unified Computing System Deployment Procedure
    Gather Necessary Information
1516 { VMware ESXi Deployment Procedure
        VMware vCenter Server Deployment Procedure
    Cisco Nexus 1010 and 1000V Deployment Procedure
    NetApp Virtual Storage Console Deployment Procedure
1510 —— NetApp Operations Manager Deployment Procedure
Appendix--FlexPod for VMware Configuration Information
    Global, NetApp, Cisco, VMware Configuration Information
1510 —— NetApp FAS3200 Sample Configuration
    Filer Sample Interface Configuration
    Sample Startup Information Configuration
    Sample Volume Information
1512 —— Cisco Nexus 5548, 1010, 1000v Sample Running Configurations
    Cisco Unified Computing System Configuration Extracts
    Sample Chassis Discovery Policy Configuration
    Create an Organization
1512 { Create MAC Address Pools
       Create Global VLAN Pools
       Create a Network Control Policy
    Create vNIC Template
    Define QoS Policies and Jumbo Frames
    Create Uplink Port-Channels to the Cisco Nexus 5548 Switches
1512 { Create WWNN Pool
       Create WWPN Pools
       Create Global VSANs
    Create vHBA Templates
    Create Boot Policies
1514 —— Create Server Pools
    Create Service Profile Templates
    Add a Block of IP Addresses for KVM Access

FIG.15

AUTOMATED TECHNIQUES TO DEPLOY A CONVERGED INFRASTRUCTURE HAVING UNKNOWN INITIAL COMPONENT CONFIGURATIONS

CROSS-REFERENCE TO RELATED APPLICATION

This application claims the benefit of U.S. Provisional Application No. 61/712,551, filed Oct. 11, 2012, which is hereby incorporated by reference in its entirety.

TECHNICAL FIELD

The present disclosure relates to automated configuring of converged infrastructures.

BACKGROUND

A data center, cloud resource, or the like, may be implemented in the form of a converged infrastructure (CI). The CI is a set of integrated Information Technology (IT) components, such as storage, network, compute, and virtualization software and/or device components. Vendors of the various CI components typically provide validated design blueprints in the form of human readable specifications that define to a user extensive step-by-step manual procedures required to perform critical operations on the components. Such operations include provisioning (i.e., initially configuring or setting-up), reconfiguring/modifying, inventorying, and assessing/validating the CI components. Therefore, the user is required to step through painstaking manual procedures set forth in the blueprints to perform the critical operations. This is time consuming and burdensome for the user.

A given design blueprint generally assumes specific, fixed hardware and/or software configurations of each of the storage, network, compute, and virtualization components of the CI. The assumed CI configurations support the critical operations defined in the blueprint. In practice, however, the CI components often have unknown operational configurations that vary or deviate from the assumed configurations. The configuration differences complicate interactions between the user, the blueprint, and the actual CI components because the user is forced to detect the differences manually and then make corresponding adjustments in order to follow the blueprint. This adds complexity and cost to performing the critical operations on the CI components.

BRIEF DESCRIPTION OF THE DRAWINGS

FIGS. 7, 8A-8C, and 9-11 depict example task definitions and associated tasks embedded therein.

FIGS. 12A-12D depict example PU model menus that may be displayed when the PU is invoked in in the operations of FIG. 3.

FIG. 15 is an excerpt from an example human readable CI design blueprint for FlexPod™ from which task definition for a Task Definition Library may be generated.

DESCRIPTION OF EXAMPLE EMBODIMENTS

Overview

Techniques are presented herein to automate and simplify for a user a deployment of a converged infrastructure (CI), which may have an initially unknown hardware and/or software configuration. One technique automatically collects component configuration information from and representative of operating storage, compute, and network components of the CI. Then, a pod descriptor is constructed based on the collected information. The pod descriptor includes operating storage, compute, and network component configuration definitions for the CI based on the collected component configuration information. A package specification unit is generated based on the component configuration definitions of the pod descriptor. The package specification unit includes tasks that, when executed, automatically inventory, assess, and configure targeted ones of the CI components. The technique executes the tasks in the package specification unit to perform corresponding operations on targeted ones of the CI components.

Example Embodiments

A converged infrastructure (CI) is a modular, integrated, often pre-configured or at least easily configured, set of information technology (IT) components, typically including storage, network, compute, and virtualization components, that may be shared across multiple user applications that require storage, network, and compute resources. Due to the modular nature of the CI, the CI components made available to the user applications may be scaled up and down relatively easily and efficiently in order to accommodate corresponding increases and decreases in user application resource requirements. Examples of known converged infrastructures (CIs) include, but are not limited to, FlexPod™ by NetApp and Cisco, VSPEX by EMC, and Vblock™ by VCE. Such known CIs are configured and operated in accordance with respective vendor CI specifications referred to herein as "blueprints" that have become quasi-industry standards.

CI Environment

Figure 1:
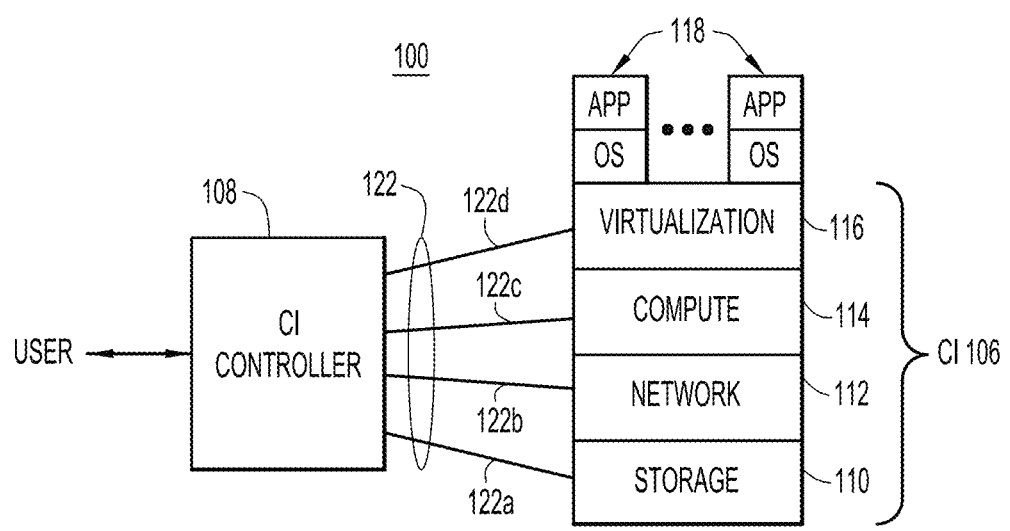
FIG. 1 is a block diagram of an example converged infrastructure environment in which a converged infrastructure (CI) is configured by and operates under control of a CI controller.

Referring first to FIG. 1, a block diagram of an example (CI) environment 100 is shown in which a CI 106 is configured by and operates under control of, a CI Controller 108. CI 106 includes an integrated set of components, including a storage component 110 to provide data storage, a network component 112 to provide connectivity to external devices and communication networks, a compute or server component 114 to provide processing capacity to the CI, and a virtualization component 116, such as a hypervisor, to host virtual environments. Virtualization component 116 may host multiple virtual user operating environments 118 on the stack of CI components 110, 112, and 114. Virtual user operating environments 118 may each include a virtualized operating system (OS), and one or more applications (APs) executing in the virtualized OS. Components 110, 112, and 114 provide respective data storage, network, and compute resources required by each OS and the respective one or more APs.

At a high-level, CI Controller 108 serves as a unified, automated, resource configured to manage CI 106. CI Controller 108 includes one or more Graphical User Interfaces (GUIs) through which a user may issue commands and provide data to the CI Controller to selectively cause the controller to perform operations with respect to CI 106, such as to provision, configure, assess/validate, and monitor the CI. As used herein, the "provision" operation may be considered an initial configure operation to configure the components of the CI for useful operation after the components have been unpacked and powered ON for the first time. Therefore, the terms "provision" and "configure" and their various forms are used interchangeably herein. Exemplary provision operations may establish storage volumes or partitions on storage component 110, establish virtual local area network (vlan) pools on network component 112, assign computing blades on compute component 114, and establish virtual resource pools on virtualization component 116.

CI Controller 108 manages CI 106 over a bi-directional communication interface 122, including component interfaces 122a, 122b, 122c, and 122d each to communicate directly with a respective one of storage, network, compute, and virtualization components 110, 112, 114, and 116. Component interfaces 122a-122d may support communications in accordance with any number of different protocols, including, for example, a network protocol such as the HyperText Transfer Protocol (HTTP). To the extent that components 110-116 of CI 106 support different interface protocols, such as a Rich Text or Extensible Markup Language (XML), component interfaces 122a-122d of CI Controller 108 correspondingly support the different protocols, and the CI Controller may be configured to communicate with components 110-116 using different protocols to maintain interface compatibility with the components as necessary.

As mentioned above, a specific design of CI 106 may be in accordance with a vendor blueprint. Because the blueprint complies with vendor specifications, the blueprint is said to represent or define a "validated" design of a CI. In one form, the blueprint is a human readable text- and graphics-based document that defines to a user manual step-by-step procedures and related information required to deploy, i.e., inventory, assess/validate, provision, and configure/reconfigure, each of the CI components in accordance with the specific design. An excerpt from an example blueprint for FlexPod™ is depicted in, and will be described briefly later in connection with, FIG. 15. The user may follow the manual procedures outlined in the blueprint to deploy CI 106; however, this is a manually intensive and time consuming activity. The design blueprint generally assumes specific, fixed hardware and/or software configurations for the storage, network, compute, and virtualization components of the CI. The assumed CI configurations support the component operations defined in the blueprint. In practice, however, the CI components may have operational hardware and/or software configurations that vary or deviate from the assumed configurations.

The techniques presented herein advantageously automate and simplify for the user the deployment of CI 106, which may have an initially unknown hardware and/or software configuration. The actual configuration may differ from a given blueprint. Thus, the techniques presented herein may be referred to as techniques to automatically deploy a CI having unknown initial hardware and/or software component configurations. In brief, in an initial phase, CI Controller 108 automatically determines the hardware and/or software configuration of CI 106. To do this, CI controller 108 collects component hardware and/or software configuration information from the CI components while the components are operating and constructs a pod descriptor (PD) that defines the actual CI component configurations based on the collected information. Then, CI controller 108 automatically generates a package specification unit (PU) from the PD and a library of tasks to which the CI controller has access. The PU includes interactive menus and tasks selected from the task library that control/interact directly with the CI components of CI 106. The tasks are "machine readable" instructions or commands formatted to conform to corresponding ones of CI component interface specifications so as to be understood by a CI component targeted by the command. The tasks, when executed, perform operations on targeted components of the CI. Because the PD accurately reflects the actual operating hardware and/or software configuration of the CI components, and because the PU is generated based on the PD, the PU also accurately reflects the actual CI components in that the tasks included in the PU are known to be supported by the CI components.

In a subsequent operational phase, the user invokes/activates the PU on CI Controller 108. The tasks embedded in the PU or to which the PU has access interact directly with targeted ones of the CI components of CI 106 to configure and operate the CI components in an automated manner. The activated PU also includes and invokes an interactive user interface through which the user may control the PU to inventory, assess/validate, provision, and configure/reconfigure the CI components in a user controlled, automated manner. In other words, the PU executes the necessary component tasks embedded therein to automatically perform user requested operations on CI 106.

CI Controller

Figure 2:
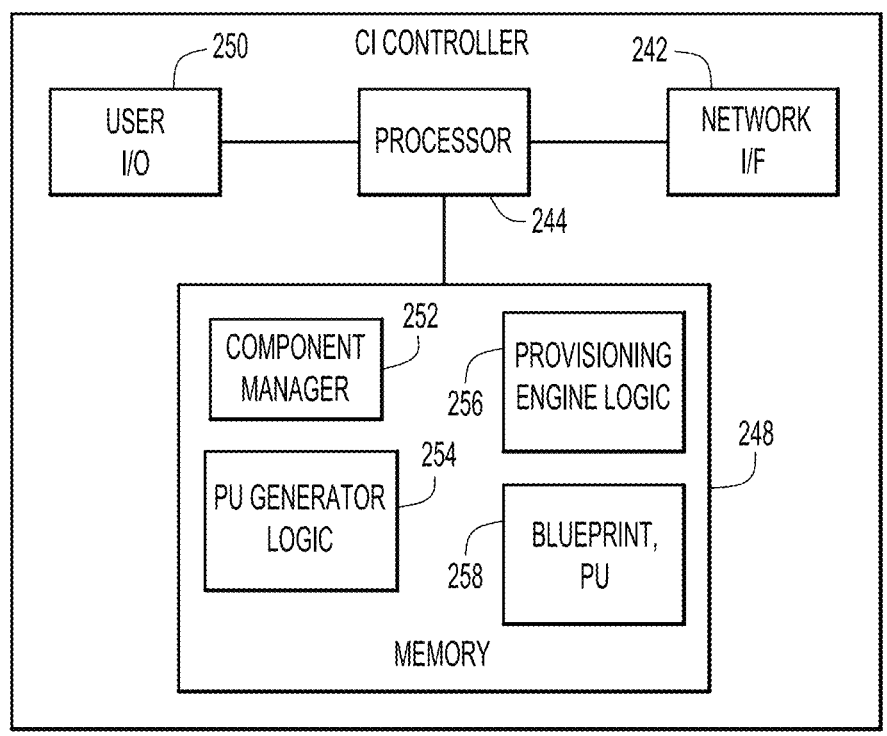
FIG. 2 is a block diagram of an example CI controller configured to perform management operations related to the CI from FIG. 1.

Reference is now made to FIG. 2, which shows an example block diagram of CI Controller 108 configured to perform the operations described herein, and particularly, to generate the PD and the PU and then activate the PU to interact with CI 106. There are numerous possible configurations for CI Controller 108 and FIG. 2 is meant to be an example. CI Controller 108 includes a network interface unit 242, a processor 244, memory 248, and a user Input/Output module 250 used in association with the one or more GUIs to enable the user to interface with the CI Controller. The network interface (I/F) unit 242 is, for example, an Ethernet card device that allows the CI Controller 108 to communicate over a network, e.g., a wired (Ethernet) network. Network I/F 242 may also include wireless connection capability. Interface 122 (from FIG. 1) may be implemented through network I/F unit 242. The processor 244 is a microcontroller or microprocessor, for example, configured to execute software instructions stored in the memory 248.

The memory 248 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 248 may comprise one or more computer readable storage media (e.g., a memory device) encoded with software comprising computer executable instructions and when the software is executed (by the processor 244) it is operable to perform the operations described herein. For example, the memory 248 stores or is encoded with instructions for Component Manager Logic 252 to perform generalized management operations on CI 106, PD Generator Logic 254 to generate a PD 256 based on collected CI component configuration information, PU Generator Logic 258 to generate a PU 260 based on the PD, and Provisioning Engine (PE) Logic 262 to activate the PU and cooperate with the PU to perform the inventory, assess/validate, provision, and configure/reconfigure operations mentioned above. In addition, memory 248 stores PD 256, PU 260, and task definitions with associated tasks in a task definition library 270. The memory GUI logic may be divided among logic units 252, 258, and 262 as necessary to support the respective logic operations.

Operation Flowchart

Figure 3:
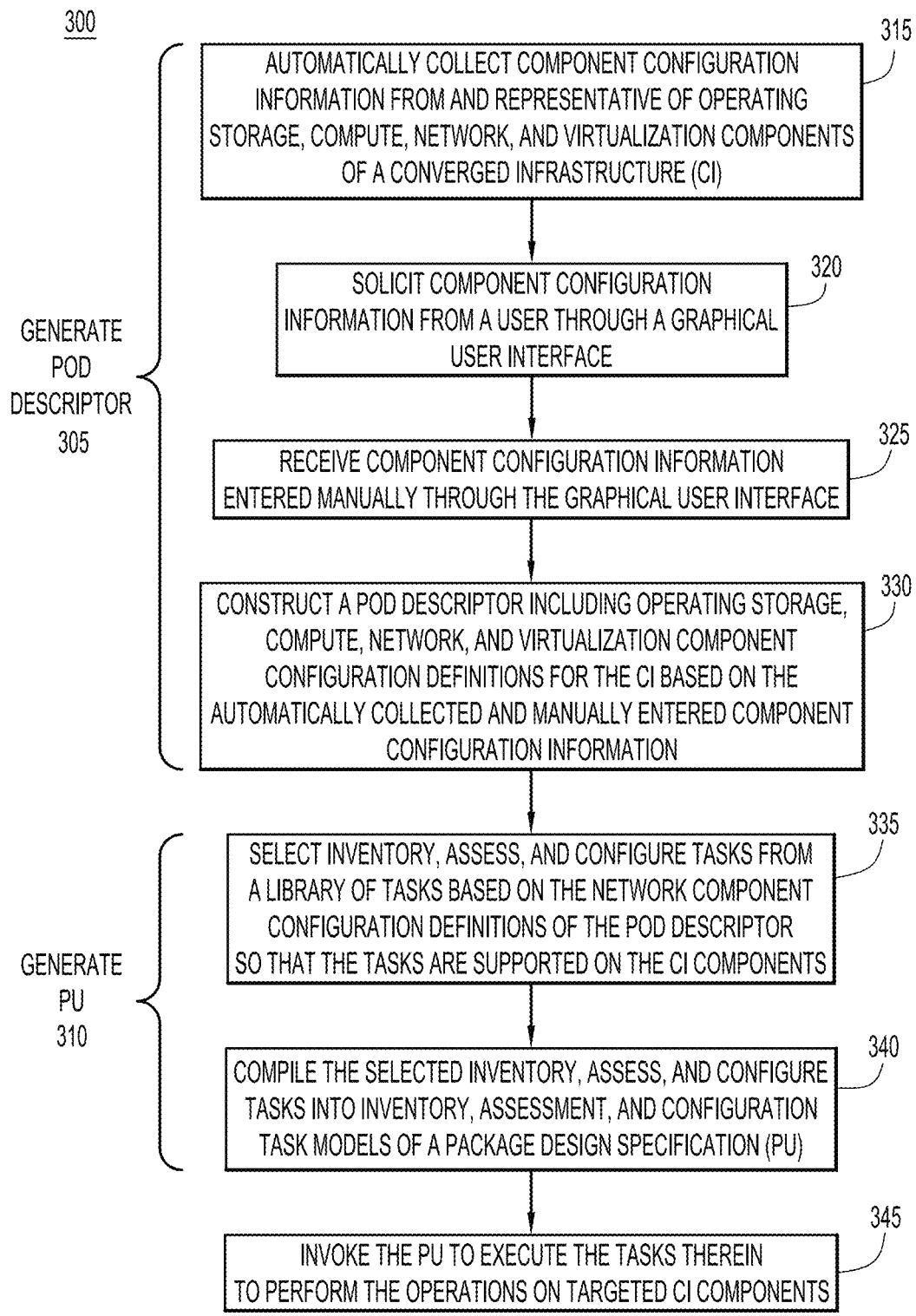
FIG. 3 is an example sequence of operations to generate a pod descriptor (PD) from collected component configuration information, and to generate a package specification unit or package unit (PU) based on the PD that may be used to perform operations on the CI of FIG. 1.

With reference to FIG. 3, a sequence of operations 300 includes a high-level operation 305 to generate PD 256 and a high-level operation 310 to generate PU 260 based on the PD.

High-level operation 305 includes detailed operations 315-330, now described.

At 315, PD Generator logic 254 automatically collects or inventories component configuration information from and representative of operating storage, compute, network, and virtualization components 110-116 of CI 106. Logic 254 may execute inventory tasks to collect the component configuration information for each of CI components 110-116 over interfaces 112a-122d. Examples of such inventory tasks will be described below in connection with FIGS. 8A-8C. Example component configuration information collected from each of CI components 110-116 includes, but is not limited to, a serial number, a model number, a software and/or operating system version, numbers and types of external interfaces (e.g., universal serial bus (USB) connectors, fibre channel protocol adapters (FCBs), etc.), numbers and identities of server blades for compute component 114, numbers and types of supported memory for storage component 110 (e.g., flash memory cards), numbers and addresses of virtual local area networks (vlans) for network component 112, inter-component connections and port mappings, and so on.

At 320, logic 254 prompts a user for customizable component configuration information through a graphical user interface.

At 325, logic 254 receives customized component configuration information entered by the user manually through the graphical user interface. Operations 320 and 325 are optional.

At 330, logic 254 constructs PD 256 including storage, compute, network, and virtualization component configuration definitions based on the automatically collected and manually entered component configuration information. The storage, compute, network, and virtualization component configuration definitions represent operating hardware and/or software configuration profiles of corresponding ones of storage, compute, network, and virtualization components 110-116.

High-level operation 310 receives PD 256 as an input and generates PU 260 based on the PD and tasks selected from task definition library 270. High-level operation 310 includes detailed operations 335 and 340, now described.

At 335, PU Generator logic 258 selects inventory, assess, and configure tasks from task definition library 270 based on the network component configuration definitions of PD 256 so that the selected tasks are supported on the CI components (as operationally configured).

At 340, logic 258 compiles the selected inventory, assess, and configure tasks into corresponding ones of inventory, assessment, and configuration task models of PU 260. Logic 258 also generates a user interface (UI) model of PU 260 that is capable of displaying operational menus to the user.

At 345, PU 260 is invoked to execute the tasks in the task models of PU 260 to perform operations on targeted ones of operating CI components 110-116, e.g., to inventory, assess, and configure targeted components.

Data Structures for Task Definition Library, Pod Descriptor, and Package Design Unit As described above in connection with FIG. 3, operations 300 rely on and generate various data structures, including task definition library 270, PD 256, and PU 260, each of which is now described in connection with FIGS. 4, 5, and 6, respectively.

Figure 4:
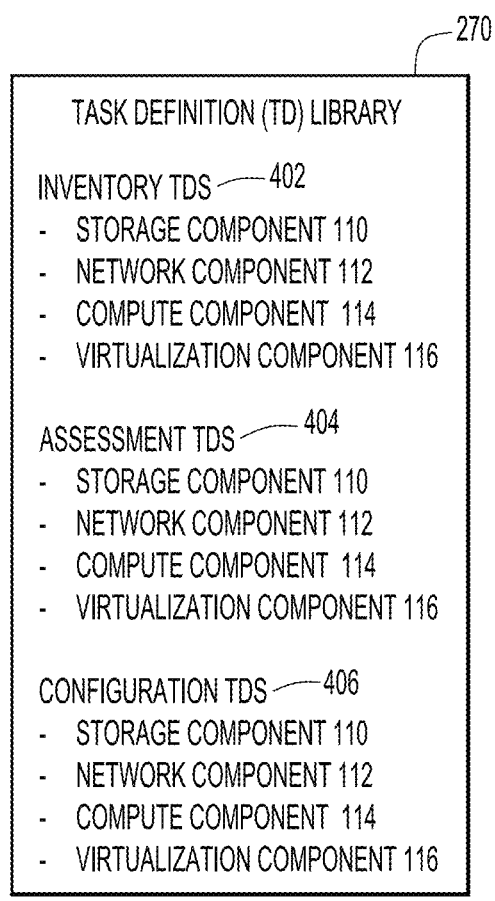
FIGS. 4, 5, and 6 are example block diagrams of a Task Definition Library, a PD, and a PU, respectively, referenced by the operations in FIG. 3.

Turning to FIG. 4, an example block diagram of task definition library 270 is shown. Task definition library 270 includes many task definitions. Each of the many task definitions is associated with a specific task that, when executed, performs an operation on a targeted one of CI components 110-116. The task is executed when the associated task definition is invoked or called by name, as will be described more fully below in connection with FIGS. 7-11.

Task definition library 270 includes:
i. multiple inventory task definitions 402 associated with inventory tasks to read data from targeted ones of the CI components, e.g., read model number, software version, port mappings, etc.;
ii. multiple assessment task definitions 404 associated with assessment tasks to assess/validate information, e.g., model number, software version, etc., related to targeted ones of the CI components; and
iii. multiple configuration task definitions 406 associated with configuration tasks to configure targeted ones of the CI components, e.g., establish vlan pools, assign server blades, etc.

Because each task definition is associated with a specific task, task definition library 270 is also referred to herein as a task library to store tasks. Also, selecting a task definition results in selecting the associated task.

Figure 5:
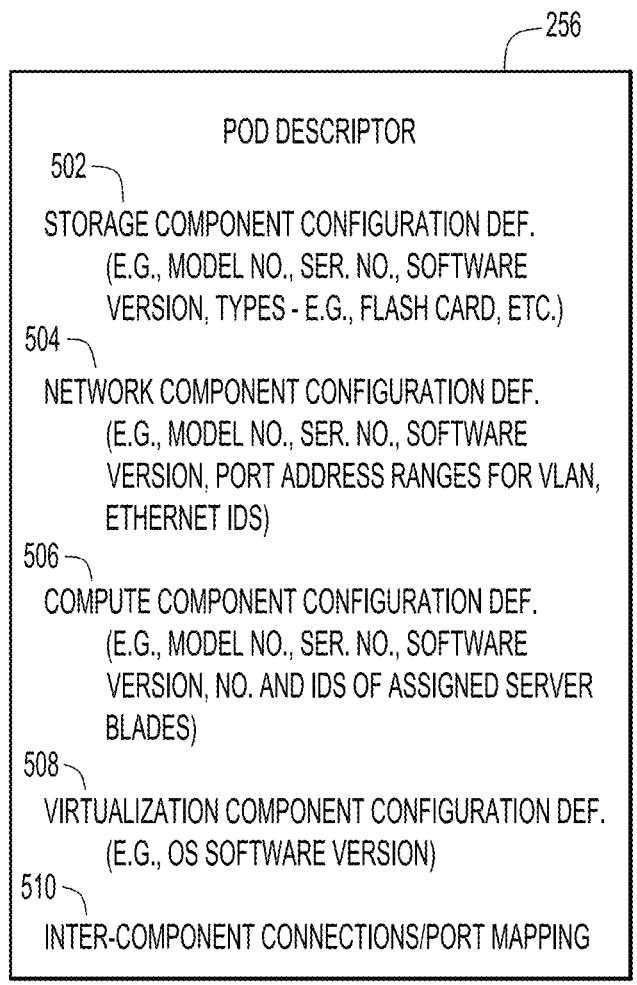

Turning to FIG. 5, an example block diagram of PD 256 is shown. PD 256 includes:
i. a storage component configuration definition 502 representative of an operating hardware and/or software configuration of storage component 110;
ii. a network component configuration definition 504 representative of an operating hardware and/or software configuration of network component 112;
iii. a compute component configuration definition 506 representative of an operating hardware and/or software configuration of storage component 114;
iv. a virtualization component configuration definition 508 representative of an hardware and/or software operating configuration of virtualization component 110; and
v. an inter-component connections/port-mapping definition 510 that defines inter-component connections and port mapping in CI 106.

Each of component configuration definitions 502-508 lists respective CI component features collected in operation 315 of FIG. 3 (e.g., model number, software version, etc., as depicted in FIG. 5).

Figure 6:
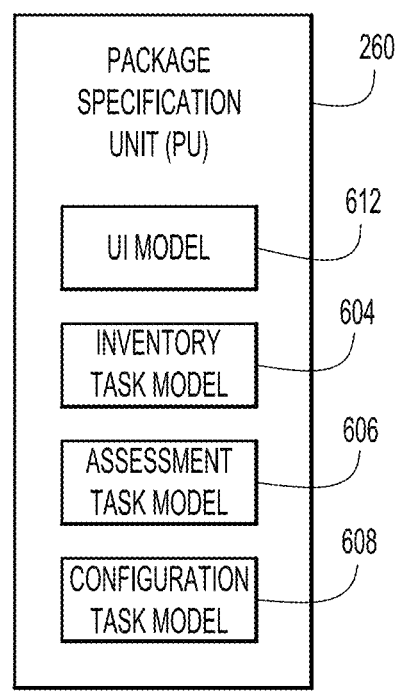

With reference to FIG. 6, there is shown an example block diagram of PU 260. PU 600 includes:
i. an Inventory Task Model 604 that is associated with inventory tasks to solicit and read component information from CI components 110-116;
ii. an Assessment Task Model 606 that includes or is associated with assessment tasks to assess/validate the CI components;
iii. a Configuration Task Model 608 that includes or is associated with configure tasks to configure the CI components; and
iv. a User Interface (UI) Model 612 that includes logic to generate display prompts or menus to solicit and receive CI component information from the user, and provide the received information to the other PU models as appropriate. Display menus associated with each of the Task Models 604-608 (discussed below in connection with FIGS. 12A-12D) may be included in the corresponding Task Models or in UI Model 612.

The PU models may be generated in formats including, but not limited to, Extensible Markup Language (XML), JavaScript Object Notation (JSON), and so on.

Task Definitions

As described above, task definitions and their associated tasks represent fundamental building blocks of task definition library 270 and PU 260. Therefore, numerous examples of task definitions and associated tasks are discussed below in connection with FIGS. 7-11. Specifically, FIGS. 7-11 depict example task definitions 700, 800, 810, 820, 900, and 1000 that may be selected from task definition library 270 at operation 335 of FIG. 3 and compiled into Inventory, Assessment, and/or Configuration Task Models 604-608 of PU 260 at operation 340, as appropriate. Each of PU Task Models 604-608 typically includes many such task definitions and associated tasks.

Generally, each task definition includes (i) a human readable task identifier (ID) that may be displayed in and selected from a corresponding task model menu, (ii) one or more CI component readable commands (also referred to interchangeable as "task" or "tasks" above) associated with the task ID and each to perform a corresponding operation on a targeted component when the task is executed (i.e., when the task definition is called by its task ID), and (iii) one or more task arguments through which one or more component parameters are passed to the tasks/commands and to the targeted component when the task definition is called by its task ID to execute the embedded task. The necessary component parameters associated with a given task (of the task definition) may be solicited from the user before the task definition is called through a corresponding UI model menu (e.g., UI menu 500D in FIG. 5D), or when the task definition is called by name to executed its embedded task. The task definitions (task ID, tasks/commands/, and task arguments) may be generated in any number of different formats including, but not limited to, plain text, XML, JSON, and so on.

The tasks/commands in each task definition conform to a vendor command specification for the targeted CI component. For example, the syntax and structure of each command may follow a vendor defined data model for the targeted component. Because each command is formatted according to the corresponding vendor defined data model, each task/command is capable of being interpreted or understood by the targeted component. In contrast, the corresponding task ID is a functional, vendor-independent (i.e., abstracted), alpha-numeric ID that is easily understood by the user. Thus, the task ID is abstracted from the vendor command specification to a higher level that is understandable to a person.

Turning now to FIG. 7, there is depicted task definition 700 to perform a configure operation on storage component 110 of CI 106, namely to make an owner assignment to a disk. Other task definitions may be constructed with a similar overall framework, i.e., structure and syntax, as task definition 700 in order to perform additional configure operations on storage component 110, or to perform configure operations on the compute, network, and virtualization components of CI 106.

Task definition 700 includes a high-level label section 702, an argument section 704, and a configuration snippet 706 (also referred to as a "configuration object fragment"). Label section 702 includes an easy to understand, functional, identifier (ID) that identifies task definition 700. In the example of FIG. 7, label section 702 includes an alphanumeric task ID "netapp-disk-assign" to identify the task definition functionally, a component category "Storage" to identify the CI component (namely, storage) to be configured functionally, and a label "Disk." Other possible component categories corresponding to the other CI components include "Compute," "Network," and "Virtualization" categories.

Argument section 704 includes definitions, i.e., names and corresponding type descriptors, of one or more component parameters to be received by configuration task 700 when it is invoked. The received component parameters are passed to configuration snippet 706. In the example of FIG. 7, argument section 704 defines two arguments corresponding to two configuration parameters to be received and passed to configuration snippet 706. The two arguments include (i) "disk" of type "string," and (ii) "owner" also of type "string."

Configuration snippet 706 includes a configuration command or task "disk-sanown-assign." The configuration command "disk-sanown-assign" performs a configure operation, namely, disk ownership assignment, on target storage component 110, when task definition 700 is invoked. When task definition 700 is invoked, the following operations occur. First, configuration parameters "$Disk" and "$Owner" are received through argument section 704 and passed to the configuration command "disk-sanown-assign" of configuration snippet 706. Then, the configuration command "disk-sanown-assign" along with the passed parameters "$Disk" and "$Owner" are pushed, i.e., provided, to target storage component 110 to perform the disk assignment operation on the storage component. The operations just described with respect to task definition 700 are understood to extend generally to other task definitions that may be constructed and invoked in accordance with the techniques described herein to perform operations on all of the components 110-116 of CI 106.

Turning to FIG. 8A, inventory task definition 800 includes a task identifier 802 "query-network-device," accepts three component parameters 804 (also referred to herein as arguments 804, and includes a task/command 805 that returns inventory information 806 (e.g., Hostname, Model, Version, SerialNumber) queried from the targeted CI component when the task/command is executed.

Turning to FIG. 8B, inventory task definition 810 includes a task identifier 812 "fcp-adapter-list-info," accepts three component parameters 814, and a task/command 816 to return inventory information 818 (e.g., adapter, port-name) queried from targeted network component 112.

Turning to FIG. 8C, inventory task definition 830 includes a task identifier 832 "emc-get-disk-info," accepts three component parameters 834, and a task/command 836 to return inventory information 838 (e.g., adapter, port name) queried from targeted storage component 110.

Turning to FIG. 9, assessment/validation task definition 900, identified at 902 as "query-network-device," validates a "Device Model" of network component 112. Task definition 900 accepts three arguments 904 and an expected value 906 for the Device Model. Task definition 900 includes a task/command 908 that queries network component 112 for its model, which is returned at 910 as "Model." Task definition 900 compares the returned model 910 against the expected value 906. If the compare indicates a mismatch, i.e., the compare failed, then the task reports/displays this failure status according to result descriptors 920. Alternatively, if there is no mismatch, i.e., the compare passes, then the task reports/displays the pass status.

Turning to FIG. 10, another configuration task definition 1000 identified at 1002 accepts two arguments 1004 and configures an Ethernet port of network component 112.

FIGS. 7-10 discussed above depict separate task definitions each associated with a task to perform a discrete operation on a targeted one of CI components 110-116. Task Models 604-608 of PU 260 may each include many task definitions and associated tasks, and may also include scripts to invoke/execute tasks in a defined sequence or order to perform a specific operational goal on targeted CI components, as is now discussed in connection with FIG. 11. In FIG. 11, there is depicted an example script 1100 of task IDs of task definitions to achieve specific configure operations on storage component 110 of CI 106, namely to create a volume 1 and a volume 2 on storage component 110. Script 1100 may be generated and compiled at operations 335 and 340 in FIG. 3.

Script 1100 references a first call 1102 to a task definition identified as "netapp-create-volume" to create a volume 1 on storage component 110. A call by identifier to a task definition results in execution of the embedded task. The call receives a first set of parameters 1104 "${volume_name}," "${aggregate_name}," and "{volume_size_in_mb}." When invoked at call 1102, the task identified as "netapp-create-volume" will create volume 1 on storage component 110 based on the parameters 1104.

Script 1100 references a subsequent, second call 1106 to the task definition identified as "netapp-create-volume" to create a volume 2 on storage component 110. The call receives a second set of parameters 1108 "${volume_ds_name}," "${aggregate_name}," and "{volume_size_in_mb}." When invoked the second time at call 1106, the task identified as "netapp-create-volume" will create volume 2 on storage component 110 based on the parameters 1108. In this way, the task definition identified as "netapp-create-volume" may be reused in succession with different parameters to configure different aspects of storage component 110.

Script 1100 includes a subsequent call 1120 to a task definition identified as "netapp-enable-sis," which accepts a single parameter 1122 to further configure storage component 110.

Scripts may be generated to configure all of the components 110-116 of CI 106. For example, assume the task definitions include: a compute component task definition including a compute component command and a corresponding compute task argument to assign a server blade among a pool of server blades on compute component 114; a storage task definition including a storage component command and a corresponding storage task argument to create a storage volume on storage component 110; and a network task definition including a network component command and a corresponding network task argument to establish a network pool and address range on network component 112. Then a script may be generated to call the compute, storage, and network task definitions to configure the storage, network, and compute components, respectively.

Package Design Unit Menus

With the above detailed description of task definitions, tasks, and scripts as context, the manner in which PU 260 may be controlled by the user to select and perform operations on CI 106 is now described in connection with FIGS. 12A-12D. FIGS. 12A-12D depict example PU model menus (and associated model tasks) that may be displayed when CI Controller 108 invokes PU 260 under user control (e.g., at operation 345 of FIG. 3) to execute the tasks in the PU. The term "menu(s)" means any prompt or list of prompts displayed to the user and through which the user may make a selection or enter information.

FIG. 12A is an illustration of an example inventory task menu 1200A that may be displayed when the user invokes PU 260. Menu 1200A lists exemplary inventory tasks by corresponding task IDs (e.g., Serial Number, Port list and status, and Neighbor Status). Each of the task IDs is associated with an underlying inventory task in Inventory Task Model 604 of PU 260. When the user selects a given task by task ID from menu 1200A, the associated underlying task is invoked, i.e., executed, to solicit the required information (e.g., Serial Number) from a targeted one of CI components 110-116.

FIG. 12B is an illustration of an example assessment task menu 1200B that may be displayed when PU 260 is invoked. Menu 1200B lists exemplary assessment tasks by task ID (e.g., Software Version, Device Model, license). Each of the task IDs is associated with an underlying task in Assessment Task Model 606 of PU 260. When the user selects a given task by task ID from menu 1200B, the associated underlying task is invoked to assess/validate a given aspect (e.g., Software Version) of a targeted one of CI components 110-116.

FIG. 12C is an illustration of an example configuration task menu 1200C that may be displayed when PU 260 is invoked. Menu 1200C lists exemplary configuration tasks by task ID (e.g., Aggregate Creation, Volume Creation, Volume Export). Each of the task IDs is associated with an underlying task in Configuration Task Model 608 of PU 260. When the user selects a given task by name from menu 1200C, the associated underlying task is invoked to configure a targeted one of CI components 110-116, e.g., to create a storage volume on storage component 110.

FIG. 12D is an illustration of an example UI model menu 1200D that may be displayed when PU 260 is invoked. Menu 1200C lists exemplary information to be solicited from the user (e.g., Disk size, World Wide Port Name (WWPN) Start Address, Media Access Control (MAC) Pool size, etc.). When the user enters the prompted information, UI model 612 of PU 600 provides the entered information to the appropriate other model in the PU.

Generating a PU

Figure 13:
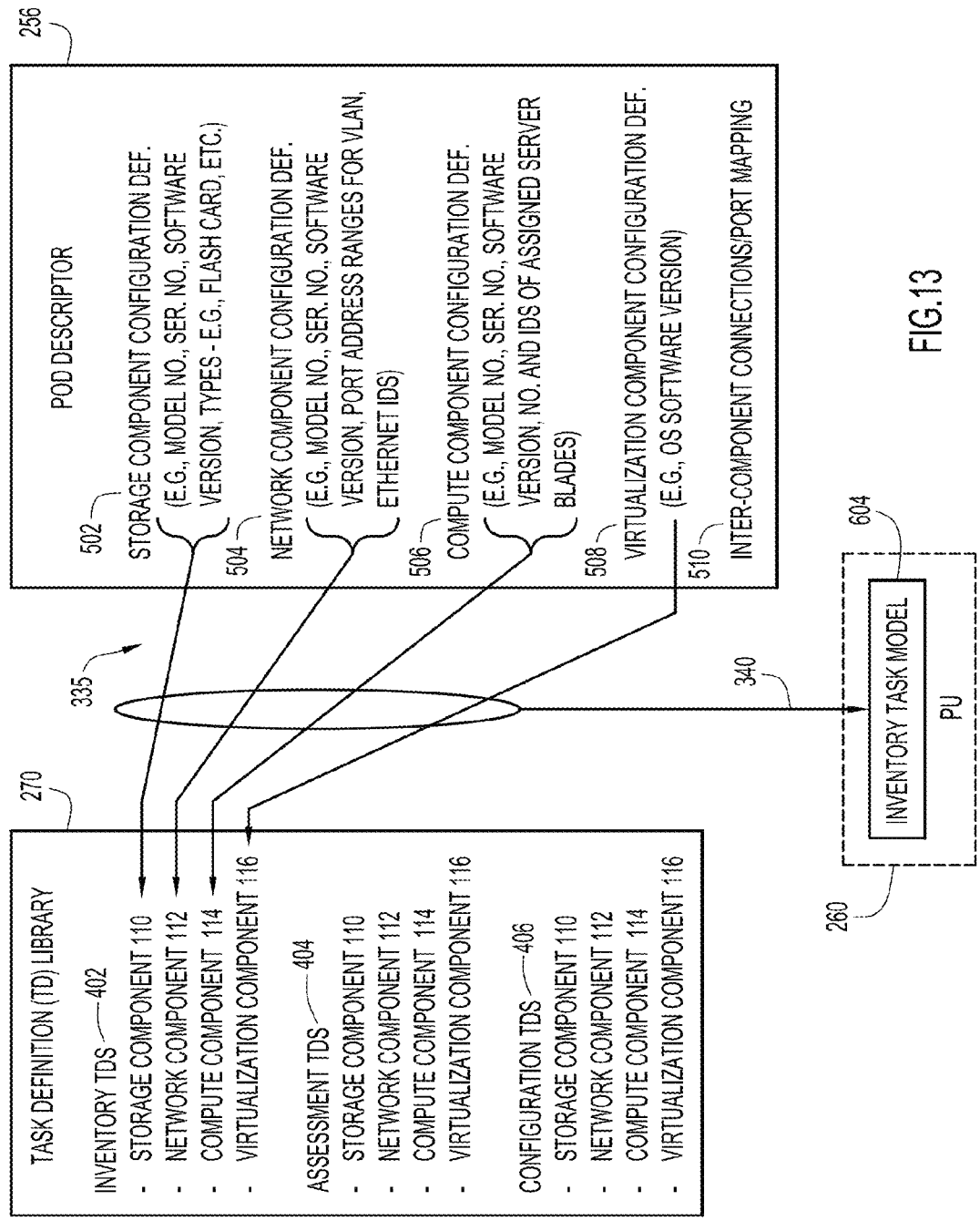
FIG. 13 is an illustration of relationships/interactions between operations from FIG. 3 to generate a portion of a PU, a Task Definition Library, and a PD.

With reference to FIG. 13, the manner in which operations 335 and 340 of FIG. 3 cooperate to generate PU 260 is now described. FIG. 13 depicts relationships between operations 335 and 340, task definition library 270, and PD 256 used to generate a portion of PU 260, namely, Inventory Task Model 604. Initially, operation 335 selects those task definitions among task definitions 402-406 that are supported by the operating configurations of storage, network, compute, and virtualization components 110-116 as defined in corresponding ones of storage, network, compute, and virtualization component configuration definitions 502-508 of PD 256. This can be thought of as mapping component configuration definitions 502-508 of PD 256 to selected ones of the task definitions 402-406. In the example of FIG. 3 to generate Inventory Task Model 604, such mapping is indicated as left-pointing arrows connecting component configuration definitions 502-508 to corresponding selected ones of task definitions of inventory task definition 402.

Operation 340 then compiles the inventory, assessment, and configuration tasks selected or mapped by operation 335 into corresponding ones of Task Models 604-608 of PU 260. In the example of FIG. 13, operation 340 compiles all of the selected inventory task definitions into Inventory Task Model 604. This compilation is indicated as a downward pointing arrow in FIG. 13. The example depicted in FIG. 13 is extended to map PD definitions 502-508 to selected ones of assessment task definitions 404 and compile the selected assessment task definitions into Assessment Task Model 606. The example is further extended to map PD definition 502-508 to selected ones of configuration task definitions 406 and compile the selected configuration tasks into Configuration Task Model 608.

CI Controller Provisioning Engine

Figure 14:
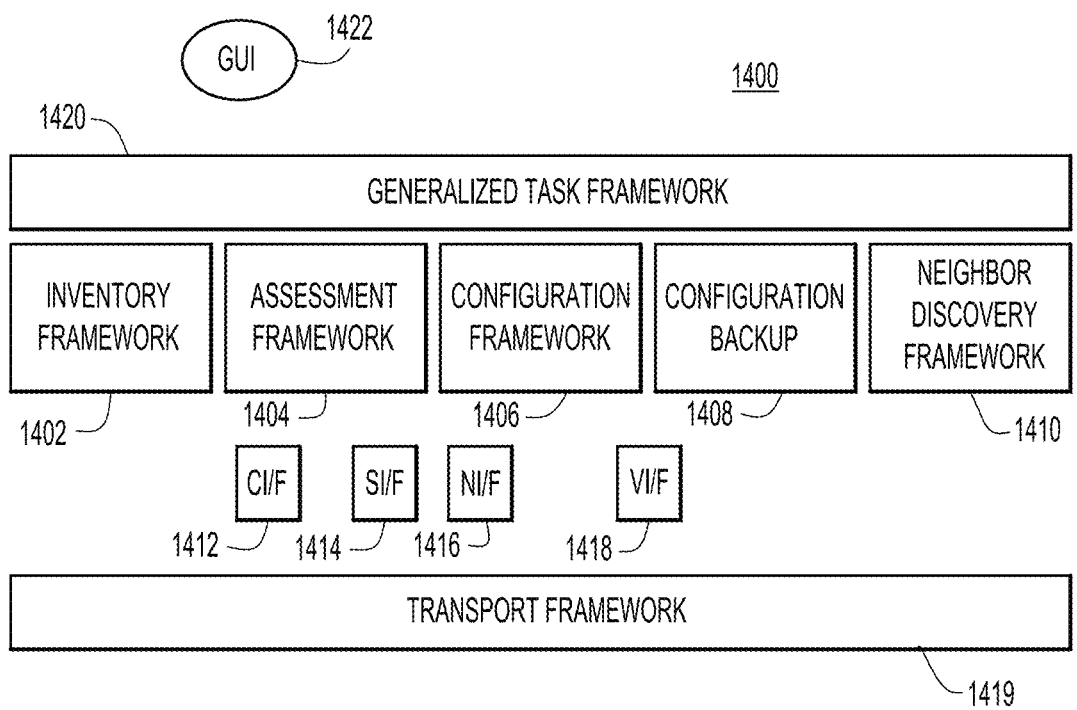
FIG. 14 is a block diagram of an example provisioning engine to support PU activation and use under user control.

FIG. 14 is a block diagram of an example configuration 1400 of Provisioning Engine logic 256. Configuration 1400 is also referred to herein as provisioning engine 1400. Provisioning engine 1400 provides a logical framework within which PU models 408-412 may operate when PU 400 is invoked at operation 345 of FIG. 3, for example. Configuration engine 1400 includes an inventory framework 1402, an assessment framework 1404, a configuration framework 1406, and a configuration backup 1408 to host and interact respectively with Inventory Task Model 404, Assessment Task Model 406, Configuration Task Model 408, and UI Model 412 of PU 400. Provisioning engine 1400 also includes a neighbor discover framework 1410.

Provisioning engine 1400 includes component/device communication drivers C I/F 1412, S I/F 1414, N I/F 1416, and V I/F 1418 to support communications (of the PU model tasks) respectively with compute component 114, storage component 110, network component 112, and virtualization component 116 through a transport framework 1419. Provisioning engine 1400 also includes a generalized framework 1420 through which the various PU models hosted in the corresponding frameworks may inter-communicate, and a GUI 1422 to support PU model interaction with the user as described above.

CI Design Blueprint and Generation of Task Definitions

As described above, task definition library 270 includes many task definitions from which appropriate task definitions are selected for incorporation into PU 260. The many task definitions in task definition library 270 may be generated from a blueprint of a CI design, as is now described. With reference to FIG. 15, there is depicted an excerpt from an example human readable CI design blueprint 1500 for Flex-Pod™ from which task definitions may be generated. The excerpt includes a sequence of line items that together form an outline or table of contents for the blueprint. That is, each line item listed is associated with further descriptive text and graphics of the blueprint not shown in FIG. 15. Collectively, the line items listed in FIG. 15 and the associated further description provide information on how to configure the storage, network, compute, and virtualization components in accordance with a validated design represented by the blueprint.

The process to generate tasks ("generate-tasks-process") from the blueprint receives the blueprint as an input. The process also receives vendor provided interface data models, i.e., specifications, for each of the storage, network, compute, and virtualization components of the CI. The interface data models define task definitions with tasks/commands to interact with and perform operations on targeted ones of the CI components.

In an initial operation, the generate-tasks-process associates each of the line items in blueprint 1500 and its associated underlying description with a corresponding one of assumed CI components and, correspondingly, with the data model for that CI component. As an example, the task generate process associates: (i) storage-related line items 1510 (and the associated underlying description) with the CI storage component (e.g., storage component 150 of CI 106), and correspondingly with the storage component interface data model; (ii) network related line items 1512 with the CI network component (e.g., network component 152) and its related data model; (iii) compute line items 1514 with the CI compute component and its related data model; and (iv) virtualization related line items 1516 with the CI virtualization component and its related data model.

As just mentioned, the initial operation associates the line items of the blueprint with appropriate corresponding component data models. A result is that the line items are now correspondingly mapped to the vendor defined task definitions available in the associated data models.

In a next operation, the generate-tasks-process maps each of the line items to one or more of inventory, assess, and provision/configure activities based on the subject matter addressed by the line item and its underlying description. After this operation, the task definitions already associated with the line items are now correspondingly associated with the one or more activities.

In a next operation, the task-generate-process populates task definition library 270 with mapped task definitions (as determined in the previous operation).

The techniques presented herein advantageously automate and simplify for the user a deployment of a CI, which has initially unknown hardware and/or software component configurations. One technique automatically determines actual hardware and/or software configurations of the CI components while the CI components are operating and stores the determined configurations in a pod descriptor. The technique automatically generates a package design unit from the pod descriptor that may be invoked by the user to perform operations on the CI components. The package design specification accurately reflects the actual configuration of the CI components because it was generated based on the pod descriptor and, therefore, is fully supported by the CI components.

In summary, in one form, a method is provided, comprising automatically collecting component configuration information from and representative of operating storage, compute, and network components of a converged infrastructure (CI); constructing a pod descriptor including operating storage, compute, and network component configuration definitions for the CI based on the collected component configuration information; generating a package specification unit based on the component configuration definitions of the pod descriptor, the package specification unit including tasks that, when executed, automatically inventory, assess, and configure targeted ones of the CI components; and executing the tasks in the package specification unit to perform corresponding operations on targeted ones of the CI components.

In another form, an apparatus is provided, comprising: a network interface unit configured to send and receive communications over a network; and a processor coupled to the network interface unit, and configured to: automatically collect component configuration information from and representative of operating storage, compute, and network components of a converged infrastructure (CI); construct a pod descriptor including operating storage, compute, and network component configuration definitions for the CI based on the collected component configuration information; generate a package specification unit based on the component configuration definitions of the pod descriptor, the package specification unit including tasks that, when executed, automatically inventory, assess, and configure targeted ones of the CI components; and execute the tasks in the package specification unit to perform corresponding operations on targeted ones of the CI components.

In still another form, a processor readable medium is provided. The processor readable medium stores instructions that, when executed by a processor, cause the processor to: automatically collect component configuration information from and representative of operating storage, compute, and network components of a converged infrastructure (CI); construct a pod descriptor including operating storage, compute, and network component configuration definitions for the CI based on the collected component configuration information; generate a package specification unit based on the component configuration definitions of the pod descriptor, the package specification unit including tasks that, when executed, automatically inventory, assess, and configure targeted ones of the CI components; and execute the tasks in the package specification unit to perform corresponding operations on targeted ones of the CI components.

Although the method, apparatus, and computer program product/processor readable medium are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
   collecting component configuration information from and representative of operating storage, compute, and network components of a converged infrastructure (CI);
   constructing a pod descriptor including operating storage, compute, and network component configuration definitions for the CI based on the collected component configuration information;
   generating a package specification unit based on the component configuration definitions of the pod descriptor, the package specification unit including tasks that, when executed, automatically inventory, assess, and configure targeted ones of the CI components; and
   executing the tasks in the package specification unit to perform corresponding operations on targeted ones of the CI components.

2. The method of claim 1, wherein the constructing the pod descriptor includes:
   prompting a user for customizable component configuration information through a graphical user interface;
   receiving customized component configuration information entered manually through the graphical user interface; and
   writing the automatically collected and the manually entered component configuration to corresponding ones of the storage, compute, and network component configuration definitions of the pod descriptor.

3. The method of claim 2, wherein the generating a package specification unit includes:
   selecting the inventory, assess, and configure tasks from a library of tasks based on the component configuration definitions of the pod descriptor so that the tasks are supported on the CI components; and
   compiling the selected inventory, assess, and configure tasks into inventory, assessment, and configuration task models of the package design specification.

4. The method of claim 3, wherein the executing includes executing the tasks in the package specification unit to inventory, assess, and configure targeted ones of the CI components.

5. The method of claim 3, wherein each task is part of a corresponding task definition that includes:
   a task identifier (ID);
   the task represented as one or more component readable commands each to perform a corresponding operation on a targeted component when the task is executed; and
   one or more task arguments through which one or more component related parameters are passed to the commands and to the targeted component when the task is executed,
   wherein executing the task includes providing the commands therein and the passed component related parameters to the targeted CI component.

6. The method of claim 1, wherein the collecting includes collecting from at least some of the CI components: a component model number; a component serial number; a software version; a number and a type of external interface ports; and a number and type of memory cards that are supported.

7. The method of claim 1, wherein:
   the collecting further includes collecting component configuration information from and representative of a virtualization component of the CI; and
   the generating further includes generating a virtualization component configuration definition in the pod descriptor based on the collected virtualization component configuration information.

8. An apparatus comprising:
   a network interface unit configured to send and receive communications over a network; and
   a processor coupled to the network interface unit, and configured to:
      collect component configuration information from and representative of operating storage, compute, and network components of a converged infrastructure (CI);
      construct a pod descriptor including operating storage, compute, and network component configuration definitions for the CI based on the collected component configuration information;
      generate a package specification unit based on the component configuration definitions of the pod descriptor, the package specification unit including tasks that, when executed, inventory, assess, and configure targeted ones of the CI components; and
      execute the tasks in the package specification unit to perform corresponding operations on targeted ones of the CI components.

9. The apparatus of claim 8, wherein the processor is configured to construct the pod descriptor by:
   prompting a user for customizable component configuration information through a graphical user interface;
   receiving customized component configuration information entered manually through the graphical user interface; and
   writing the collected and the manually entered component configuration to corresponding ones of the storage, compute, and network component configuration definitions of the pod descriptor.

10. The apparatus of claim 9, wherein the processor is configured to generate the package specification unit by:
    selecting the inventory, assess, and configure tasks from a library of tasks based on the component configuration definitions of the pod descriptor so that the tasks are supported on the CI components; and
    compiling the selected inventory, assess, and configure tasks into inventory, assessment, and configuration task models of the package design specification.

11. The apparatus of claim 10, wherein the processor is configured to execute the tasks in the package specification unit to inventory, assess, and configure targeted ones of the CI components.

12. The apparatus of claim 10, wherein each task is part of a corresponding task definition that includes:
    a task identifier (ID);
    the task represented as one or more component readable commands each to perform a corresponding operation on a targeted component when the task is executed; and one or more task arguments through which one or more component related parameters are passed to the commands and to the targeted component when the task is executed, wherein the processor configured to provide the one or more commands therein and the passed component related parameters to the targeted CI component.

13. The apparatus of claim 8, wherein the processor is configured to collect from at least some of the CI components: a component model number; a component serial number; a software version; a number and a type of external interface ports; and a number and type of memory cards that are supported.

14. The apparatus of claim 8, wherein the processor is configured to:
collect component configuration information from and representative of a virtualization component of the CI; and
generate a virtualization component configuration definition in the pod descriptor based on the collected virtualization component configuration information.

15. A non-transitory processor readable medium storing instructions that, when executed by a processor, cause the processor to:
collect component configuration information from and representative of operating storage, compute, and network components of a converged infrastructure (CI);
construct a pod descriptor including operating storage, compute, and network component configuration definitions for the CI based on the collected component configuration information;
generate a package specification unit based on the component configuration definitions of the pod descriptor, the package specification unit including tasks that, when executed, inventory, assess, and configure targeted ones of the CI components; and
execute the tasks in the package specification unit to perform corresponding operations on targeted ones of the CI components.

16. The processor readable medium of claim 15, wherein the instructions to cause the processor to construct the pod descriptor include instructions to cause the processor to:
prompt a user for customizable component configuration information through a graphical user interface;
receive customized component configuration information entered manually through the graphical user interface; and
write the collected and the manually entered component configuration to corresponding ones of the storage, compute, and network component configuration definitions of the pod descriptor.

17. The processor readable medium of claim 16, wherein the instructions to cause the processor to generate the package specification unit include instructions to cause the processor to:
select the inventory, assess, and configure tasks from a library of tasks based on the component configuration definitions of the pod descriptor so that the tasks are supported on the CI components; and
compile the selected inventory, assess, and configure tasks into inventory, assessment, and configuration task models of the package design specification.

18. The processor readable medium of claim 17, wherein the instructions to cause the processor to execute include instructions to cause the processor to execute the tasks in the package specification unit to inventory, assess, and configure targeted ones of the CI components.

19. The processor readable medium of claim 17, wherein each task is part of a corresponding task definition that includes:
a task identifier (ID);
the task represented as one or more component readable commands each to perform a corresponding operation on a targeted component when the task is executed; and
one or more task arguments through which one or more component related parameters are passed to the commands and to the targeted component when the task is executed,
wherein the instructions to cause the processor to execute the task include instructions to cause the processor to provide the one or more commands therein and the passed component related parameters to the targeted CI component.

20. The processor readable medium of claim 15, wherein the instructions to cause the processor to collect include instructions to cause the processor to collect from at least some of the CI components: a component model number; a component serial number; a software version; a number and a type of external interface ports; and a number and type of memory cards that are supported.

21. The processor readable medium of claim 15, wherein:
the instructions to cause the processor to collect includes instructions to cause the processor to collect component configuration information from and representative of a virtualization component of the CI; and
the instructions to cause the processor to generate include instructions to cause the processor to generate a virtualization component configuration definition in the pod descriptor based on the collected virtualization component configuration information.

* * * * *